Figure 4A:
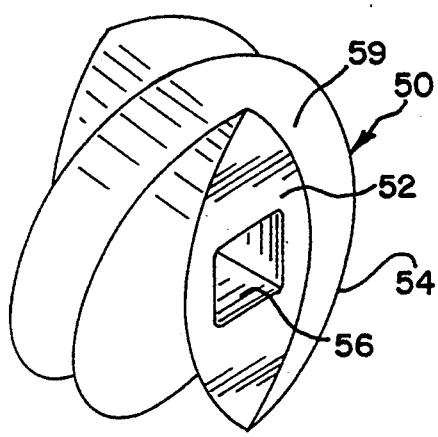
Figure 4B:
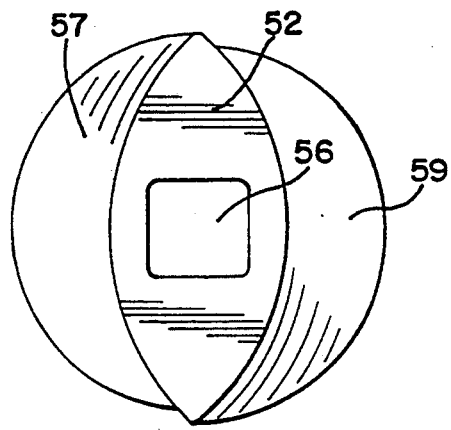
Figure 5A:
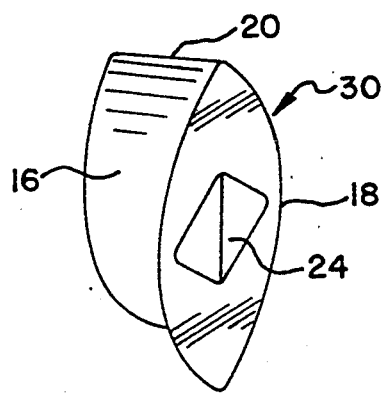
Figure 5B:
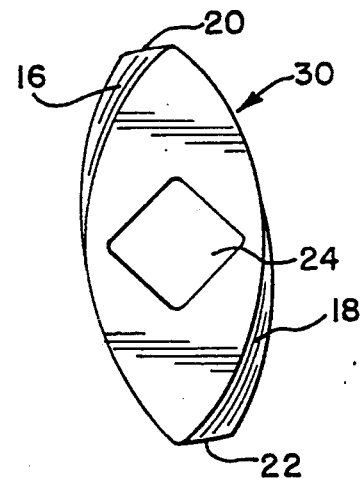
Figure 6A:
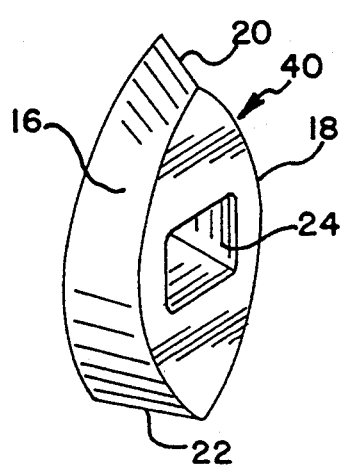
Figure 6B:
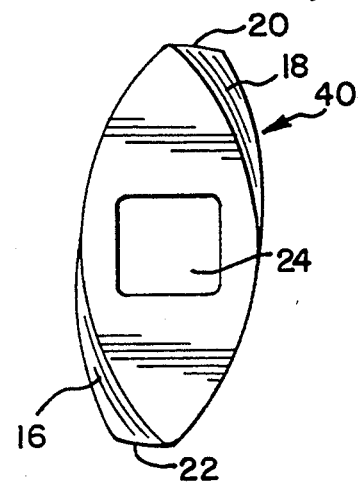
Figure 5C:
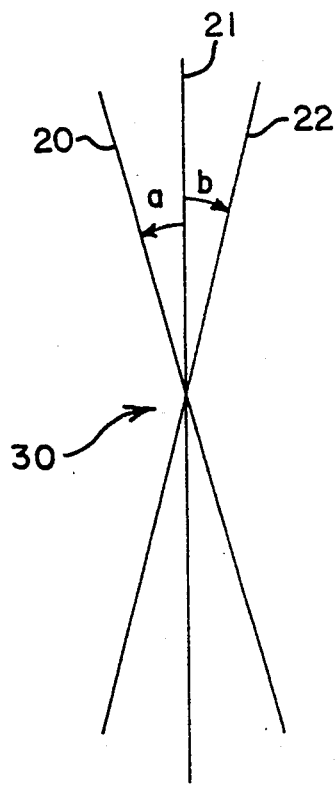
Figure 6C:
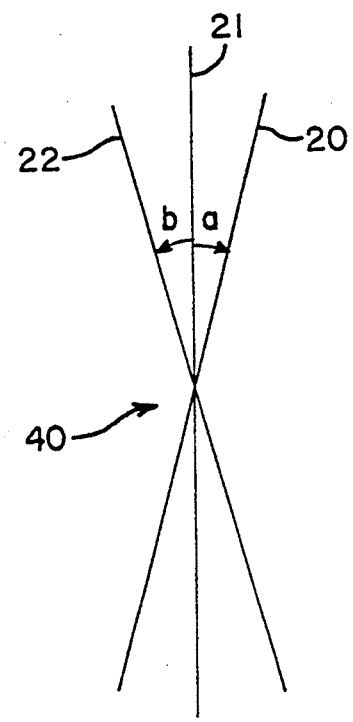
Figure 9:
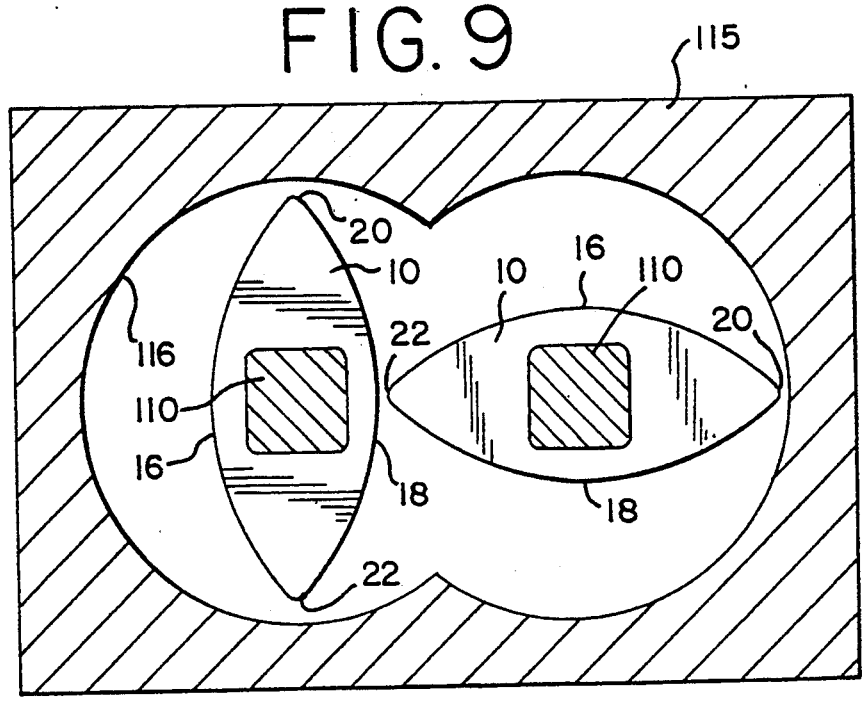

United States Patent [19]

Masson et al.

[11] Patent Number: 5,419,920
[45] Date of Patent: May 30, 1995

[54] METHOD FOR MARKING AN OBJECT TO ENABLE ITS DETECTION FROM A DISTANCE IN THE EVENT OF LOSS OR THEFT

[76] Inventors: Claudine J. C. Masson, 295 rue Saint Jacques, 75005 Paris; Marie-Florence O. J. Thal, 15ter rue des Clos Saint-Marcel, 92330 Sceaux, both of France

[21] Appl. No.: 104,938

[22] Filed: Aug. 12, 1993

Related U.S. Application Data

[63] Continuation of Ser. No. 439,037, Oct. 2, 1989, abandoned.

[30] Foreign Application Priority Data

Mar. 30, 1987 [FR] France .................. 87 0439

[51] Int. Cl.⁶ ............................. B05D 3/02
[52] U.S. Cl. ............................. 427/7; 427/290; 427/291; 427/292; 427/337; 427/384; 427/385.5; 427/407.1
[58] Field of Search ............. 427/7, 53.1, 385.5, 427/290-292, 384, 337, 407.1

[56] References Cited

U.S. PATENT DOCUMENTS

| | | | |
|---|---|---|---|
| 3,733,178 | 5/1973 | Eriksen | 23/230 B |
| 4,226,194 | 10/1980 | Grahn | 109/25 |
| 4,517,920 | 5/1985 | Yamamoto | 119/1 |
| 4,698,620 | 10/1987 | Marshall | 340/568 |

*Primary Examiner*—Janyce Bell
*Attorney, Agent, or Firm*—Cushman, Darby & Cushman

[57] ABSTRACT

A quantity of at least one odorous substance that is physiologically impossible to perceive by the human sense of smell, but which is sufficient to be perceived at a distance by an animal known to be capable of finding the origin of the odor emitted by said odorous substance or substances and/or that causes the animal to exhibit a given behavior in its presence, is affixed to the object to be marked in a manner not identifiable by the human eye. Detection by animals such as canines and insects (cockroaches, bees and butterflies) can be used; the odorous substances will in particular comprise substances known to be capable of being detected specifically and spontaneously by an animal at extremely low thresholds ($\alpha$-ionone for the canine), or pheromonal (sexual or warning) substances that, in the animal located at a distance, bring about a modification of its behavior.

9 Claims, 5 Drawings

FIG. 2
FIG. 1
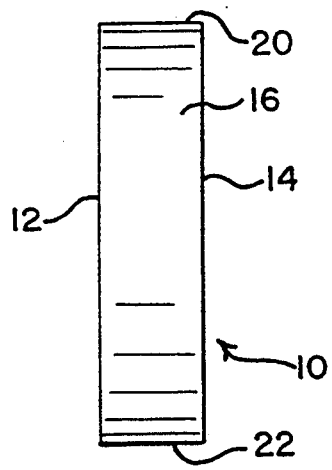
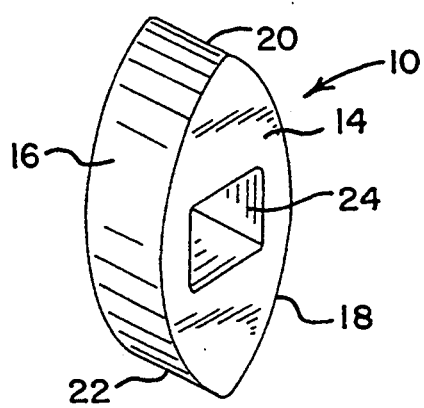
FIG. 3(a)
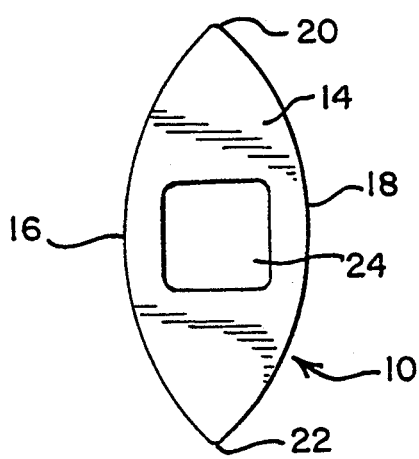
FIG. 3(b)
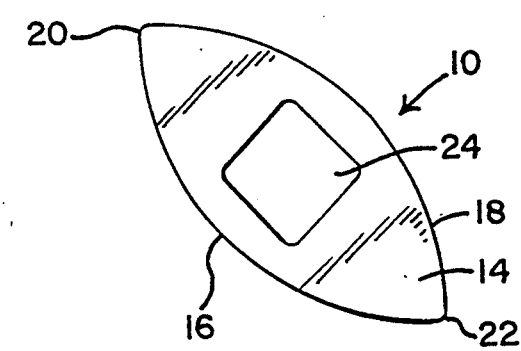
FIG. 3(c)
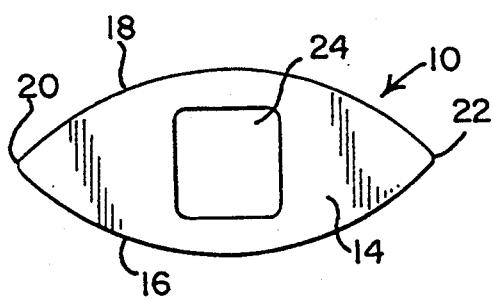
FIG. 3(d)
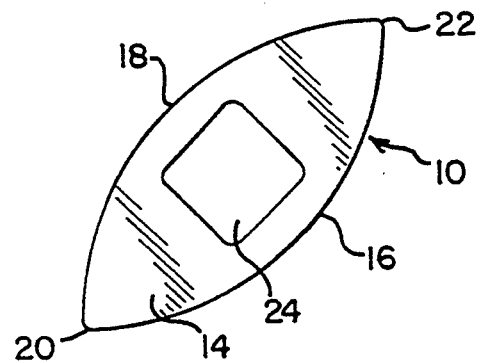

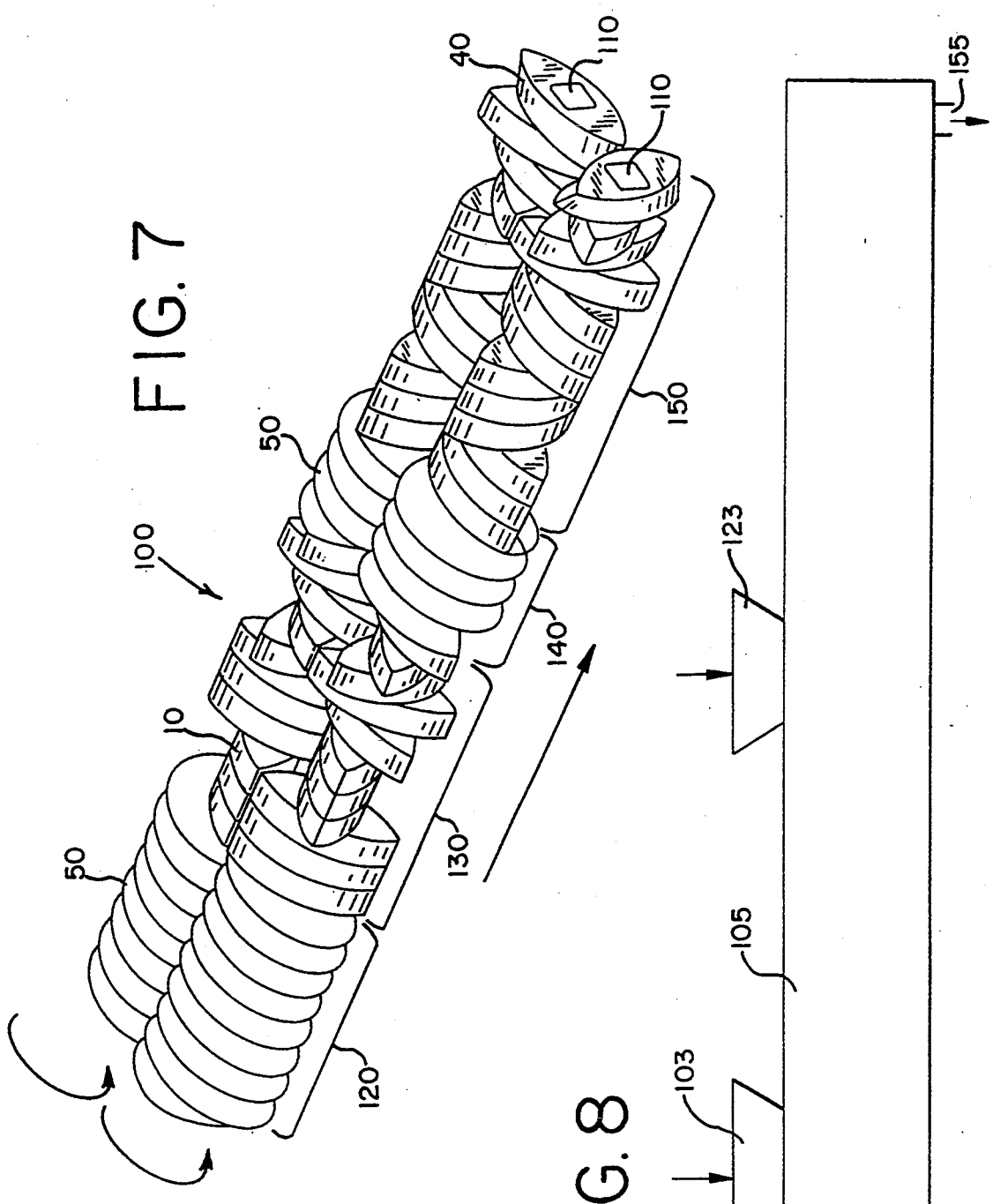

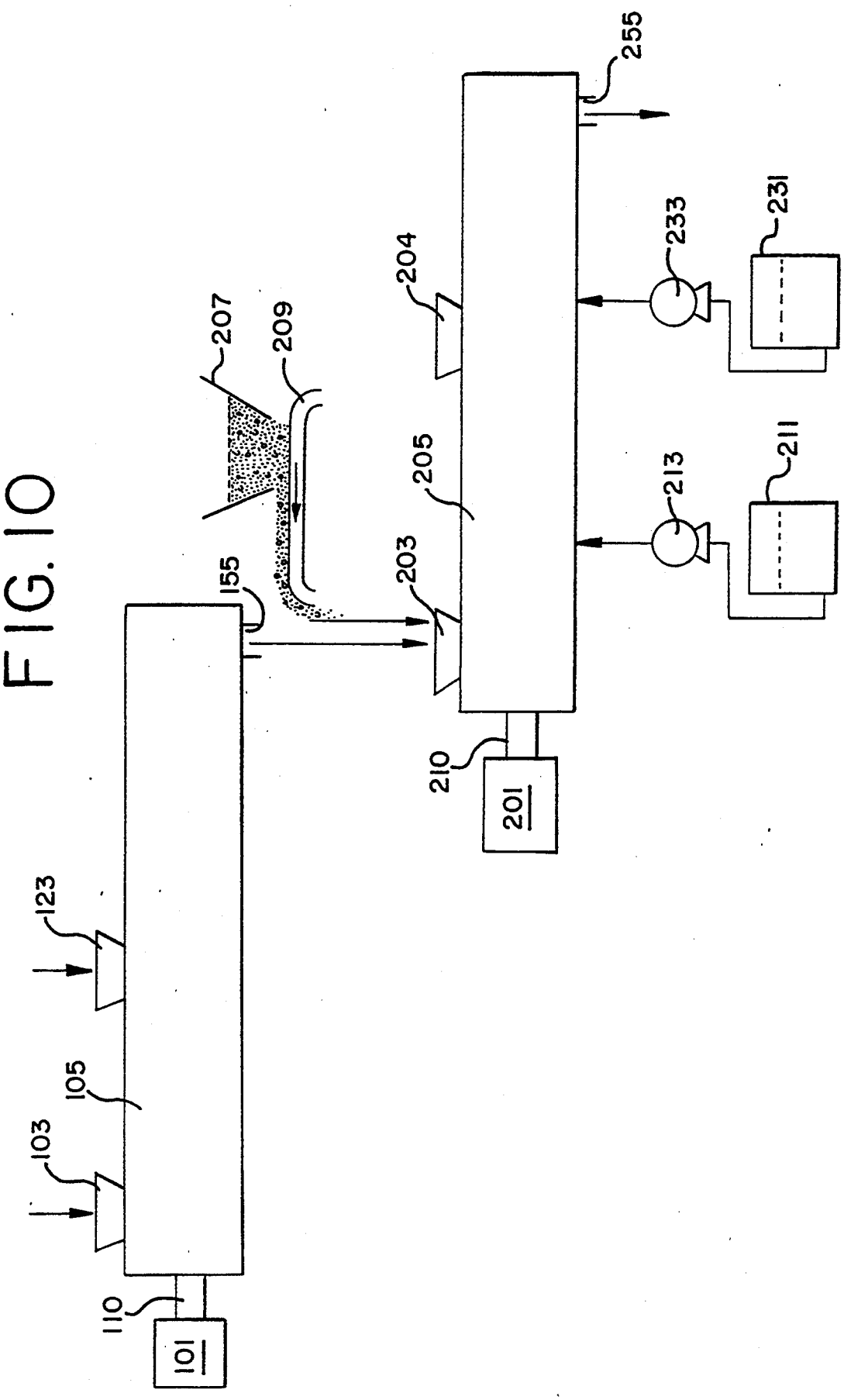

METHOD FOR MARKING AN OBJECT TO ENABLE ITS DETECTION FROM A DISTANCE IN THE EVENT OF LOSS OR THEFT

This is a continuation of application Ser. No. 07/439,037, filed on Oct. 2, 1989, now abandoned.

The present invention relates to a method for marking an object in order to be capable of detecting it later in the event it is lost or stolen. Such marking is especially valuable for art objects, precious items, and collectible items.

It is often extremely difficult, even for an expert, to determine infallibly whether an art object that is found is indeed the original object sought, or merely a copy of it. Furthermore, once an art object has been stolen, searches made at customs stations, even if done as systematically as possible, are never certain to reach a favorable outcome, for obvious reasons.

Consequently it appeared that to facilitate searching for a valuable article that has been stolen, or even if it has been lost by its owner, there should be some way of marking the object such that in case of loss or theft, the marking can later be detected very rapidly, particularly at customs stations, even if the object has been concealed from view.

The marking must meet at least two conditions; the first, which is fundamental, is that it cannot be detected by the thief; the second, which also has its own importance, is that considering the unique or precious nature of the object, its market value which for an object that is a national treasure may be inestimable and requires that the object remain intact—the marking must not cause any deterioration of the object.

Having stated this problem, the present invention overcomes it with an original and efficacious solution. That is, according to the invention, on the one hand, the sense of smell is used, which is much better developed in certain mammals, whether naturally or after training, than in the human being, so that by their sense of smell these mammals can locate the origin of even extremely tenuous odors; on the other hand, the invention makes use of the specific behavioral reactions brought about in numerous species of mammals in response to chemical substances, known as pheromones, given off into the environment by a member of the same genus, for example to mark the limits of his territory, to bring the sexes together in mating seasons, or to warn of danger. Hence it will be seen that it is sufficient to affix to the object to be marked a specific odorous substance, or a specific mixture of odorous substances, of which it is known that the substance or mixture is absolutely undetectable by the human sense of smell, yet contrarily is detectable by a given animal, or a given group of animals, either naturally or after the animal or group of animals has been trained or conditioned.

In parallel, this mode of detection by an animal provides a solution to all aspects of the problem presented above:

first, the doses of odorous substance or substances that can be used are by nature extremely low doses, and in particular are microscopic doses, so that given the numerous means at the disposal of one skilled in the art, it is extremely easy to affix them totally invisibly to the object to be marked;

second, the mode of detection is extremely reliable, since it is based on a physiological behavior typical of the animal selected; moreover, by definition, the detection can be made at a distance even if the object is hidden from view; furthermore, it is extremely convenient and can also be less expensive, in the case where the dogs normally present at customs stations, which have been trained to detect drugs, are used for remote location of marked objects; and third, it would in practice be completely impossible for a thief, even if he suspected the existence of a marking, to learn the particular combination of the detecting animal and the type of odorous substance or substances used, which is the only way he would be able to avoid being located. In fact, the animal species theoretically usable are very numerous; on the other hand, the odorous chemical substances comprising the pheromones are innumerable. Considering the impressive number of animal species (especially insects) that naturally use chemical signals for their life and survival (eating, reproduction, and so forth), and considering that there is a a large sample, both well-defined and limited, of substances entering into the composition of the pheromones, on the one hand, and a virtually unlimited number of substances capable of bringing about specific attraction behaviors after training, on the other hand, that correspond to each species, it can be imagined that it is impossible to make an exhaustive list of volatile molecules capable of being used either alone or in mixtures.

Hence the subject of the present invention is a method for marking an object, without deteriorating it and without enabling anyone to have means for detecting the marking unless he knows both of its existence and its nature, said marking being effected in order, in the case of loss or theft of the marked object, to permit finding of said object, or determining whether an object appearing identical to the naked eye is or is not the object sought, characterized in that a quantity of at least one odorous substance that is physiologically impossible for the human to perceive but is sufficient to be perceived at a distance by an animal known to be capable of locating the origin of the odor emitted by said odorous substance or substances, and/or which evokes a given behavior in the animal in the presence of the substance or substances, is affixed to the object to be marked in a manner not identifiable by the human eye.

The term "substances physiologically impossible for a human to perceive" is intended to mean substances that for physiological reasons are not specific to the human being, or substances that are used largely below their threshold of liminal detection.

According to the present invention, one or more odorous substances capable of being perceived by an animal belonging to the canine family, such as dogs, or to the class of insects, such as butterflies, cockroaches and bees, are used in particular.

In a first feature of the method according to the present invention, one or more odorous substances capable of being detected spontaneously by an animal or group of animals belonging to a given family or species are used.

In particular, as indicated above, one or more pheromonal substances specific to an animal species are used. The term "pheromonal substance" is intended here to mean either the pheromone itself or a substance entering into its composition. It is in fact known that the majority of pheromones are constituted by more or less complex associations of molecules. In particular, according to the present invention, pheromonal substances are used that are selected from among the sexual or warning pheromonal substances.

In the case where at least one odorous substance capable of being perceived by canines is used, said odorous substance or substances are selected from among the following:

aliphatic fatty acids with short chains of two to six carbon atoms, such as acetic acid, propionic acid, isobutyric acid, isovaleric acid and isocaproic acid;

ketones, such as α-ionone and 2-piperidone;

aldehydes, such as 4-hydroxy-3-methoxy benzaldehyde;

amines such as triethylamine;

o- and p-hydroxy benzoic acids and their esters, in particular p-hydroxy benzoic acid, p-hydroxymethyl benzoate, p-hydroxyethyl benzoate and p-hydroxypropyl benzoate, and methyl salicylate (orthohydroxybenzoate); and various crude extracts of urine, as well as their active principles.

In particular, α-ionone can be mentioned as an odorous substance, either alone or in association with at least one other odorous substance. α-ionone is detected specifically and spontaneously by the canine at extremely low thresholds of $4 \cdot 10^4$ to $4 \cdot 10^6$ molecules per $cm^3$, while the threshold of detection of this same substance for a human being is about $3.1 \cdot 10^8$ molecules per $cm^3$. This type of marking requires no training of the animal used for the detection. As indicated above, it will be entirely possible to use the dogs normally present at customs stations and trained in detecting drugs.

In a second feature of the present invention, one or more odorous substances capable of being detected by an animal or group of animals having undergone training or conditioning for recognition of said odorous substance or substances are used.

It is impossible to give an exhaustive list of the odorous principles (in pure and/or mixed form) that can be used for training animals which will then be particularly effective for detecting them at a low threshold. Lists of odorous molecules identified by their molecular weight and their saturation vapor tension will be found in standard works such as "Handbook of Organic Chemistry", for example, and in specialized works in the field of olfaction, psychophysiology and animal behavior, for example the series of works entitled "Chemical Signals in Vertebrates".

The substances will be selected as a function of the behavioral threshold of detection of the animal, which as already noted above must imperatively be different from that of the human being, which limits the number of molecules that can be used.

In the case where at least one odorous substance capable of being perceived by canines is used, the odorous substance or substances can be selected from among the principles entering into the composition of drugs such as marijuana and hashish. In particular, caryophyllene epoxide can be cited as an odorous substance, either alone or mixed with at least one other odorous substance. Caryophyllene epoxide is detected by the dog in trace amounts of $1 \cdot 10^{-6}$ g, or in other words a volatilized quantity of $10^{-12}$ moles per liter.

Knowing that it is sufficient to train the animal for a complex mixture of molecules, for the animal to be capable of effectively detecting any one of these constituent products, provided that it is present at a concentration compatible with the behavioral detection threshold of the animal with respect to this substance, it will be understood that the number of marking combinations is particularly high.

Concerning this second aspect of the invention, it can also be pointed out that animals trained in detecting drugs will also be usable directly for location, from a distance, of objects marked in this way.

In accordance with the present invention, the quantity of odorous substance or substances can be trapped in a substrate that is attached invisibly to the human eye to the object to be marked. This will be the case particularly when the method must be used for marking objects such as tapestries and carpets; books, stamps and paintings; furs and leathers; and furniture.

According to the invention, the quantity of odorous substance or substances can also be trapped in and/or on a substrate comprising the object to be marked itself. This will be the case particularly if the method is to be applied to marking metal objects, such as articles made of gold, or objects made of oxides or silicoaluminates such as ceramics, glassware and precious and semiprecious stones.

In the first case indicated above, a film, capillary, cartridge, fiber or sponge will be used as the substrate; preferably, these items will be synthetic in nature, such as polyethylene and the like. Moreover, various methods may be employed to trap the odorous substance or substances on the substrate; in particular, grafting and the injections of solutions or odorized granules can be mentioned.

Additionally, the manner in which the substrate (odorous trap) is included in the object depends on the nature of the object, and possibly on the chemical characteristics of the principles used for the marking.

In the second case mentioned above, in a first variant, electrochemical grafting of at least one polymer, in which the odorous substance or substances have been included, to the surface of the object to be marked can be performed. In a second variant, microdrilling on the surface of the object to be marked can performed with the aid of a YAG power laser, in order to make a microscopic trap into which the odorous substance or substances carried by a substrate can be introduced.

A substrate of this kind may comprise an organic and/or synthetic fiber or capillary in which the odorous substance or substances have been trapped; in that case, the fiber is ballwound in the trap created in the object, and its length is directly associated with both the chemical characteristics of the selected signal and its salting-out time. The trap may also be constituted by a saturated solution of said odorous substance or substances and polymerized in situ, or a molecular sieve cartridge containing the odorous substance or substances and crushed into the microscopic opening; the mesh of the sieve is necessarily selected as a function of the size of molecules selected, and the volume introduced (and consequently the volume of the trap) depends on the optimal salting-out time.

In making the substrate or trap for the odorous substance or substances, one skilled in the art will have to consider the dimensions of the trap, which must be compatible with absolute unidentifiability by the human eye, and he will then have to estimate the time needed for salting-out of the molecules in the ambient air; this time in fact correlates directly with the quantity of product that he will then have been able to introduce into the substrate or trap.

Once an object has been detected at a distance, located, and retrieved, its authenticity can optionally be assured by identifying the odorous marking, using chromatographic analysis of the trapped effluvia from the object.

We claim:

1. A method for marking an object to enable detection thereof in the event of loss or theft without deterioration of the object or capability of detection by an unauthorized person lacking knowledge of the presence or nature of the marking comprising the step of applying at least one of a pheromonal substance to the object and which is directly and without an intermediary undetectable by humans but is detectable at a distance from the object by animals including a species of animal that emits the pheromonal substance including an insect species, and a substance that is undetectable by humans but is detectable at a distance from the object by a canine animal, the substance being selected from the group comprising aliphatic fatty acids with short chains of two to six carbon atoms, ketones, aldehydes, amines, o-and p-hydroxy benzoic acids, esters of benzoic acids, crude extracts of urine and the odor generating materials of said crude extracts and the odor generating materials of marijuana and hashish, wherein the method is applied in particular to the marking of metal objects including articles of gold, or objects of oxides or silicoaluminates such as ceramics, glassware, precious and semiprecious stones, characterized in that the quantity of odorizing substance or substances is trapped in or on a substrate comprising the object to be marked itself, and the method includes the step of applying at least one polymer which is reactive with the substance to be applied to the object and the substance deposited on the object by means of an electrochemical reaction between the substance and said at least one polymer.

2. A method as defined by claim 1, characterized in that pheromonal substances that are selected from among the sexual or warning pheromonal substances are used.

3. A method as defined by claim 1, characterized in that one or more odorous substances capable of being detected by an animal or group of animals having undergone training or conditioning for recognition of said odorous substance or substances are used.

4. A method as defined by claim 1, characterized in that caryophyllene epoxide is used as the odorous substance, either alone or in association with at least one other odorous substance.

5. A method as defined by claim 1, applied in particular to the marking objects including of tapestries and carpets; books, stamps and paintings; furs and leathers; and furniture, characterized in that the quantity of odorous substance or substances is trapped in a substrate attached in a manner invisible to the human eye to the object to be marked.

6. A method as defined by claim 5, characterized in that as the substrate, a film, capillary, cartridge, fiber or sponge is used.

7. A method as defined by claim 5, characterized in that the odorous substance or substances are trapped on the substrate by grafting, or injection of solutions or of odorizing granules.

8. A method of marking an object to enable detection thereof in the event of loss or theft without deterioration of the object or capability of detection by an unauthorized person lacking knowledge of the presence or nature of the marking comprising the step of applying at least one of a pheromonal substance to the object and which is undetectable by humans but is detectable at a distance from the object by a species of animal that emits the pheromonal substance including an insect species and a substance which is undetectable by humans but is detectable at a distance from the object by a canine animal, the substance being selected from the group comprising aliphatic fatty acids with short chains of two to six carbon atoms, ketones, aldehydes, amines, o- and p-hydroxy benzoic acids, esters of benzoic acids, crude extracts of urine and the odor generating materials of said crude extracts and the odor generating materials of marijuana and hashish; said object including a metal portion of one of gold, an oxide or silicoaluminates including one of a ceramic, glassware, precious and semiprecious stone and including the step of trapping the substance in a substrate comprising the object itself by microdrilling the surface of the object to provide a microscopic trap and introducing the substance into said trap on a support selected from one of an organic or synthetic fiber which carries said substance and on which the substance has been polymerized in situ or on a molecular sieve cartridge containing said substance.

9. The method as defined in claim 1 including the step of selecting a pheromonal substance that induces a known activity in a selected insect species.

* * * * *

UNITED STATES PATENT AND TRADEMARK OFFICE
CERTIFICATE OF CORRECTION

PATENT NO. : 5,419,920
DATED : May 30, 1995
INVENTOR(S) : Masson et al.

It is certified that error appears in the above-indentified patent and that said Letters Patent is hereby corrected as shown below:

On the title page, item [30], insert —Mar. 18, 1988 PCT FR88/00142—

Signed and Sealed this

Seventh Day of May, 1996

Attest:

BRUCE LEHMAN

Attesting Officer    Commissioner of Patents and Trademarks